(12) United States Patent
Omeragic et al.

(10) Patent No.: US 6,566,881 B2
(45) Date of Patent: *May 20, 2003

(54) SHIELDING METHOD AND APPARATUS USING TRANSVERSE SLOTS

(75) Inventors: Dzevat Omeragic, Sugar Land, TX (US); Jean Seydoux, Sugar Land, TX (US); Richard A. Rosthal, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/746,927

(22) Filed: Dec. 22, 2000

(65) Prior Publication Data

US 2001/0004212 A1 Jun. 21, 2001

Related U.S. Application Data

(63) Continuation-in-part of application No. 09/452,660, filed on Dec. 1, 1999.

(51) Int. Cl.[7] .................................................. G01V 3/30
(52) U.S. Cl. ....................................................... 324/338
(58) Field of Search ................................ 324/338–343, 324/346, 356, 369; 336/84 R, 84 M, 84 C; 343/841

(56) References Cited

U.S. PATENT DOCUMENTS

| 3,944,910 A | | 3/1976 | Rau ............................ 324/338 |
| 4,319,191 A | | 3/1982 | Meador et al. .............. 324/341 |
| 4,536,714 A | | 8/1985 | Clark ........................... 324/338 |
| 4,689,572 A | * | 8/1987 | Clark ........................... 324/341 |
| 4,704,581 A | | 11/1987 | Clark ........................... 324/341 |
| 4,808,929 A | | 2/1989 | Oldigs ......................... 324/339 |
| 4,857,852 A | * | 8/1989 | Kleinberg et al. ........... 324/339 |
| 4,873,488 A | | 10/1989 | Barber et al. ................ 324/339 |
| 4,949,045 A | | 8/1990 | Clark et al. .................. 324/338 |
| 5,115,198 A | | 5/1992 | Gianzero et al. ............ 324/339 |

(List continued on next page.)

OTHER PUBLICATIONS

JK Park and HJ Eom, 'Radiation from Multiple Circumferential Slots on a Conducting Circular Cylinder,' *IEEE Transactions on Antennas and Propagation*, vol. 47, No. 2, pp. 287–292 (Feb. 1999).

JD Shumpert and CM Butler, Penetration through Slots in Conducting Cylinders–Part 1: TE Case, *IEEE Transactions on Antennas and Propagation*, vol. 46, No. 11, pp. 1612–1621 (Nov. 1998).

JD Shumpert and CM Butler, Penetration through Slots in Conducting Cylinders–Part 2: TM Case, *IEEE Transactions on Antennas and Propagation*, vol. 46, No. 11, pp. 1622–1628 (Nov. 1998).

*Primary Examiner*—Edward Lefkowitz
*Assistant Examiner*—Reena Aurora
(74) *Attorney, Agent, or Firm*—John J. Ryberg; Brigitte L. Jeffery; Victor H. Segura

(57) ABSTRACT

A shielding method and apparatus for an antenna disposed on an elongated support adapted for disposal within a borehole. The shield providing predetermined attenuation of one or more electromagnetic energy field components as the field components interact with the shield. The shield composed of a flexible strip or cylindrical body and respectively comprising a transverse conductive element or a transverse slot therein. The shields being adapted to cover an antenna mounted on the support. The shields being compatible for use in conjunction with saddle, tilted coils or multi-layered tri-axial coils to produce a pure transverse magnetic dipole electromagnetic field. The shields are also used in methods for shielding an antenna disposed on a support to provide predetermined attenuation of an electromagnetic field component as the field components interact with the shield.

38 Claims, 9 Drawing Sheets

U.S. PATENT DOCUMENTS

| | | |
|---|---|---|
| 5,508,616 A | 4/1996 | Sato et al. .................. 324/343 |
| 5,631,563 A | 5/1997 | Moriarty ..................... 324/338 |
| 5,757,191 A | 5/1998 | Gianzero .................... 324/339 |
| 5,767,674 A | 6/1998 | Griffin et al. ............... 324/303 |
| 6,044,325 A | 3/2000 | Chakravarthy et al. ........ 702/7 |
| 6,147,496 A | 11/2000 | Strack et al. ............... 324/343 |
| 6,191,586 B1 | 2/2001 | Bittar ........................ 324/339 |
| 6,297,639 B1 | 10/2001 | Clark et al. ................. 324/338 |

* cited by examiner

SHIELDING METHOD AND APPARATUS USING TRANSVERSE SLOTS

This application is a continuation-in-part of U.S. patent application Ser. No. 09/452,660, filed Dec. 1, 1999 entitled "Shield Apparatus for Use in Conjunction with a Well Tool."

1. BACKGROUND OF THE INVENTION

1.1. Field of the Invention

This invention relates to the field of well logging, and more particularly, to improved shields for use with logging instruments using sources or sensors having a transverse or tilted magnetic dipole.

2.2. Description of Related Art

Electromagnetic (EM) logging instruments have been employed in the field of hydrocarbon exploration and production for many years. These logging instruments or "sondes" entail an elongated support member equipped with antennas that are operable as sources and/or sensors. These antennas are generally coils of the cylindrical solenoid type and are comprised of one or more turns of insulated conductor wire that is wound around the support. U.S. Pat. No. 4,873,488 (assigned to the present assignee), for example, describes logging instruments equipped with antennas disposed along a central support.

In operation, a transmitter antenna is energized by an alternating current to emit EM energy into the formation. The emitted energy interacts with the surrounding formation to produce signals that are detected and measured by one or more antennas. The measured signals are then processed to determine the electrical properties, such as permittivity or conductivity, of the formation.

Conventional EM logging techniques include "wireline" logging and logging-while-drilling (LWD). Wireline logging entails lowering the instrument into the borehole at the end of an electrical cable to obtain the subsurface measurements as the instrument is moved along the borehole. LWD entails attaching the instrument disposed in a drill collar to a drilling assembly while a borehole is being drilled through earth formations. A new method sometimes referred to as logging-while-tripping (LWT) involves placing a logging tool near the bottom of the drill string and making measurements while the string is withdrawn from the borehole.

A coil carrying a current can be represented as a magnetic dipole having a magnetic moment proportional to the product of the current and the area encompassed by the coil. The direction and strength of the magnetic moment can be represented by a vector perpendicular to the plane of the coil. In the case of more complicated coils which do not lie in a single plane (i.e. saddle coils referenced later), the direction of the dipole moment is given by: o∫r×dl and is perpendicular to the effective area of the coil. This integral relates to the standard definition of a magnetic dipole of a circuit. See J. A. Stratton, ELECTROMAGNETIC THEORY, McGraw Hill, New York, 1941, p. 235, FIG. 41. Integration is over the contour that defines the coil, r is the position vector and dl is the differential segment of the contour.

In conventional induction and propagation logging instruments, the transmitter and receiver antennas are mounted with their axes along, or parallel, to the longitudinal axis of the instrument. Thus, these instruments are implemented with antennas having longitudinal magnetic dipoles (LMD).

If the transmitter and receiver antennas on these instruments were perfectly configured and balanced in a theoretically ideal system, the EM energy emitted by the antennas would propagate in a mode known as a transverse electric (TE) mode, of the type generated by an ideal vertical magnetic dipole in an azimuthally symmetric media. However, under actual operating conditions, there are various factors that give rise to the generation of significant undesired EM field components. One approach to alleviating this problem is with the use of antenna shields to reduce the transmission and/or reception of spurious and unwanted EM field components. These shields are typically used in conjunction with each antenna on the instrument although they can be used with only some of the antennas. For instance, if each shield provides N dB attenuation of undesired modes, then having shields on both transmitters and receivers will provide 2N dB of attenuation. If N dB is enough for the measurements desired, then shields may be used only for the transmitters or only for the receivers.

U.S. Pat. Nos. 5,631,563, 4,808,929, 4,949,045, and 4,536,714 (all assigned to the present assignee) disclose conventional antenna shields used with these instruments to provide mechanical protection for the antennas and to permit the passage of desired EM field components. As shown in FIG. 1*a*, these shields 10 are in the form of a metal cylinder that has slots 12 in the axial direction. The slot 12 pattern allows the azimuthal electric field (Eφ) component to pass through with little attenuation, while the radial (Er) and axial (Ez) are attenuated more as they pass through the shield.

An alternative viewpoint is to represent each axial slot 12 as an axial magnetic dipole, as shown in FIG. 1*b*. These magnetic dipoles couple to axial magnetic fields (Bz), but do not couple to azimuthal magnetic (Bφ) fields. The shielded antennas are thus rendered substantially insensitive to parasitic transverse magnetic (TM) EM fields associated with borehole modes, and which have radial (Er) and axial (Ez) electric fields and azimuthal magnetic fields (Bφ).

An emerging technique in the field of well logging is the use of instruments with tilted or transverse antennas, i.e., where the coil's axis is not parallel to the support axis. These instruments are thus implemented with antennas having a transverse or tilted magnetic dipole moment (TMD). One instrument configuration comprises tri-axial coils, involving three coils with magnetic moments that are not co-planar. The aim of these TMD configurations is to provide EM measurements with directed sensitivity and sensitivity to the anisotropic resistivity properties of the formation.

Logging instruments equipped with TMDs are described in U.S. Pat. Nos. 6,044,325, 4,319,191, 5,115,198, 5,508, 616, 5,757,191, 5,781,436 and 6,147,496. Common to these apparatus and techniques, however, is the need to manipulate the antenna itself. None of these disclosures address the implementation of shields as alternative means to achieve selective EM energy attenuation.

A transverse slot concept has been used in design of high frequency communication antennas. See Shumpert, J. D., and Butler, C. M., 'Penetration through slots in conducting cylinders—Part 1: TE case, '*IEEE Trans. Antennas and Propagation,* vol. 46, pp. 1612–1621, 1998; Shumpert, J. D., and Butler, C. M., 'Penetration through slots in conducting cylinders—Part 2: TM case, '*IEEE Trans. Antennas and Propagation,* vol. 46, pp. 1622–1628, 1998; Park, J. K., and Eom, H. J., 'Radiation from multiple circumferential slots on a conducting circular cylinder, '*IEEE Trans. Antennas and Propagation,* vol. 47, pp. 287–292, 1999. These papers present methods for modeling the EM field. However, the concept and physical setup in communications applications is different from that involved with logging applications. A key difference being the frequency range of operation: logging instrument antennas generally operate in EM diffusion regime while communication antennas operate in propagation regime, where dimensions of antennas and slots are comparable to wavelength.

It is desired to implement a technique to produce a pure transverse magnetic dipole EM field for subsurface formation measurements. Still further, it is desired to implement a shield apparatus that can be used in conjunction with saddle, tilted coils or multi-layered tri-axial coils to produce such a field.

2. SUMMARY OF THE INVENTION

A shield apparatus adapted for use in conjunction with a logging instrument provides predetermined attenuation of one or more electromagnetic energy field components as the field interacts with the shield.

One aspect of the invention is an apparatus for use with an elongated support that is adapted for disposal within a borehole, the support having a longitudinal axis. The apparatus comprises a body adapted to form a cylindrical surface; the body being adapted for mounting on the support; and the body having at least one slot formed therein such that the slot is perpendicular to the longitudinal axis when the body is mounted on the support; wherein the body provides predetermined attenuation of an electromagnetic field component as the field interacts with the body.

Another aspect of the invention is an apparatus for use with an elongated support that is adapted for disposal within a borehole, the support having a longitudinal axis. The apparatus comprises a flexible strip adapted to surround the support, the strip being formed of a non-conductive material; and at least one conductive element disposed on the strip such that the element is perpendicular to the longitudinal axis when the strip surrounds the support; wherein the strip provides predetermined attenuation of an electromagnetic field component as the field interacts with the strip.

Another aspect of the invention is a system for measuring a property of a subsurface formation. The system comprises an elongated support having a longitudinal axis, the support being adapted for disposal within a subsurface borehole traversing the formation; a source or sensor is mounted on the support; a shield is mounted on the support to cover the source or sensor; and the shield has at least one slot formed therein, the slot being perpendicular to the longitudinal axis of the support; wherein the shield provides predetermined attenuation of an electromagnetic field component as the field interacts with the shield.

Another aspect of the invention is a system for measuring a property of a subsurface formation. The system comprises an elongated support having a longitudinal axis, the support being adapted for disposal within a subsurface borehole traversing the formation; a source or sensor is mounted on the support; a flexible strip is mounted on the support to cover the source or sensor; and the strip has at least one conductive element disposed therein, the element being perpendicular to the longitudinal axis of the support; wherein the strip provides predetermined attenuation of an electromagnetic field component as the field interacts with the strip.

Another aspect of the invention is a method for shielding a source or sensor disposed on an elongated support having a longitudinal axis and adapted for disposal within a borehole. The method comprises mounting a body adapted to form a cylindrical surface on the support to cover the source or sensor, the body having at least one slot formed therein such that the slot is perpendicular to the longitudinal axis, wherein the body provides predetermined attenuation of an electromagnetic field component as the field interacts with the body.

Another aspect of the invention is a method for shielding a source or sensor disposed on an elongated support having a longitudinal axis and adapted for disposal within a borehole. The method comprises mounting a flexible strip on the support to cover the source or sensor, the strip having at least one conductive element disposed therein such that the element is perpendicular to the longitudinal axis, wherein the strip provides predetermined attenuation of an electromagnetic field component as the field interacts with the strip

3. BRIEF DESCRIPTION OF THE DRAWINGS

Other aspects and advantages of the invention will become apparent upon reading the following detailed description and upon reference to the drawings in which.

4. DESCRIPTION OF ILLUSTRATIVE EMBODIMENTS

As discussed above, conventional shields used in logging instruments universally have slots that are aligned along the longitudinal axis of the instrument. The orientation of the slots is perpendicular to the electric field generated by the source within or the field that is to be detected by the sensor. If the incident field has an unwanted component of the electric field that lies along the slot, then currents will flow in the metal to cancel that field and only the normal component will remain. For conventional induction or propagation instruments, the desired electric field is azimuthal, and longitudinal slots allow that field to pass. If the coil was wound at an angle $\theta$ to the axis of the instrument, then the desired electric field is no longer azimuthal, but rather has both azimuthal and longitudinal components that vary as a function of the azimuthal position.

Figures 1A, 1B, 2:
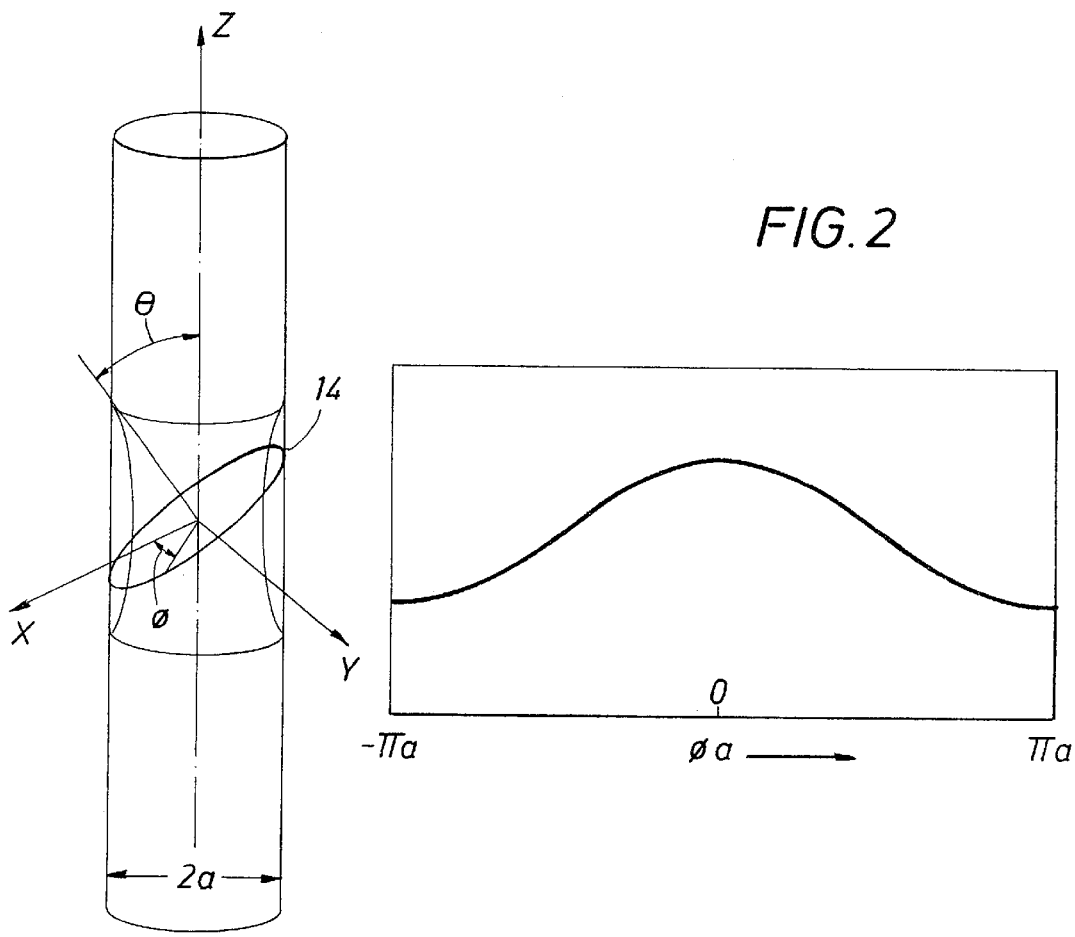
FIG. 1a is a schematic diagram of a conventional cylindrical shield with axial slots. Directed arrows are representative of the interaction between the shield and the electric field components of incident electromagnetic energy.
FIG. 1b is a schematic diagram of a conventional cylindrical shield with axial slots. Directed arrows are representative of the interaction between the shield and the magnetic field components of incident electromagnetic energy.
FIG. 2 is a schematic diagram of a coil wound at an angle θ to the longitudinal axis of the instrument. Also depicted is a view of the tilted coil as projected onto a two-dimensional surface.

FIG. 2 illustrates a coil 14 wound at an angle $\theta$ to the longitudinal axis (represented by dashed lines) of the instrument and having radius $\alpha$. Projecting the coil 14 onto a two-dimensional surface as shown, the height of the coil 14 is described by a sinusoidal function of the azimuthal angle around the instrument $\phi$:

$$f(\phi) = \alpha \tan \theta \cos \phi. \quad (1)$$

An actual coil would probably have multiple windings, described by equation (1), but with an additional term $p\phi$, where p is the pitch. Effective shields for such coil configurations should preserve both the mechanical advantages and the EM advantages offered by conventional shields.

4.1. Sloped Slot Pattern

Figure 3:
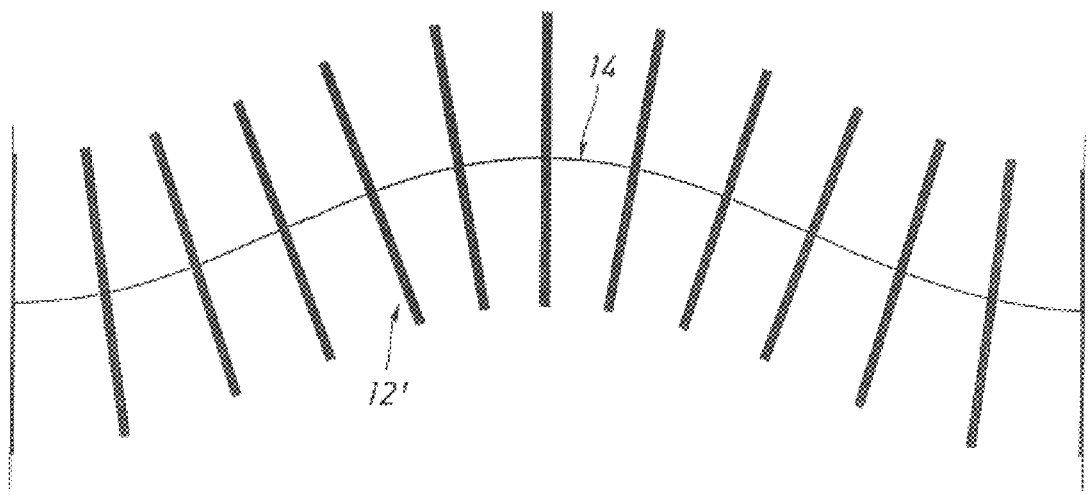
FIG. 3 is a schematic diagram of a sloped slot pattern superimposed onto a tilted coil and projected onto a two-dimensional surface. The slots are maintained perpendicular to the coil winding(s).

A shield to let pass the desired EM field components, and attenuate the undesired ones, should have at least one sloped slot that is sloped at an angle $\theta$ with respect to the instrument axis. A sloped slot pattern for a tilted coil 14, projected onto a two-dimensional surface, is shown in FIG. 3. The slots 12' are perpendicular to the coil 14 at the intersection of the slot 12' and coil 14. This allows the electric field component that is parallel to the coil 14 to pass through the shield with minimal attenuation. This electric field will have azimuthal and axial components, but no radial component. The slope of the slot 12' is given by $$1/(\alpha \tan \theta \sin \phi). \quad (2)$$

Alternatively, one can represent the slots 12' as a collection of point magnetic dipoles on the surface of a conducting cylinder (not shown). The location of each magnetic dipole is given by Equation (1), and their orientation is given by Equation (2). Each individual magnetic dipole has an axial component and an azimuthal component.

Figure 4:
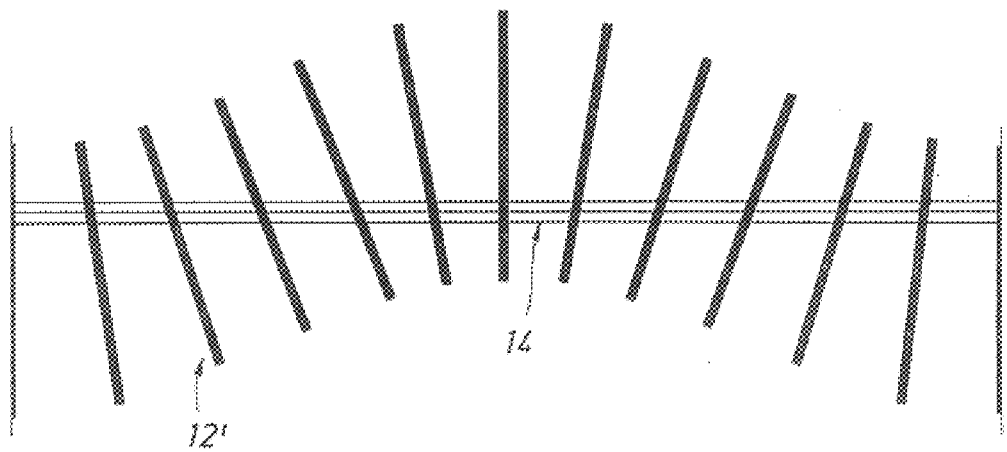
FIG. 4 is a schematic diagram of a sloped slot pattern superimposed onto a non-tilted (axial) coil and projected onto a two-dimensional surface.

While the above discussion has assumed that the antenna under the shield is tilted at an angle $\theta$ with respect to the instrument axis, the shields 10 can also be used with an axial coil 14. With this configuration, the axis of the coil magnetic dipole can be selectively rotated. FIG. 4 illustrates a sloped slot 12' pattern superimposed onto an axial coil 14 and projected onto a two-dimensional surface.

Figure 5:
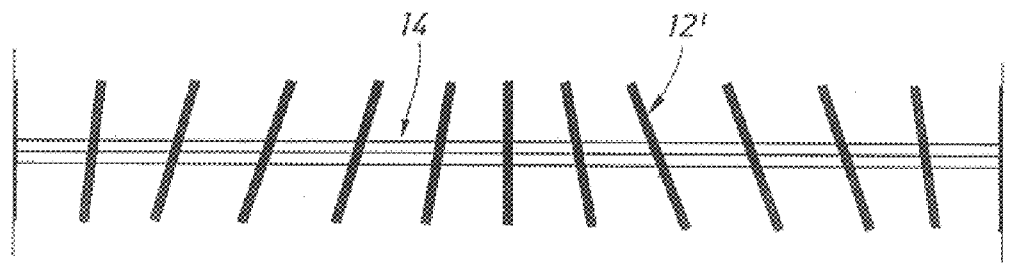
FIG. 5 is a schematic diagram of the sloped slot pattern of FIG. 4 with the slots maintained centered over the coil winding(s).

As shown in FIG. 4, the slots 12' are no longer perpendicular to the coil 14 windings. This may affect the relative strength of the TMD component to the axial magnetic dipole component. One approach to minimize these effects would be to maintain the slots 12' centered over the antenna, as shown in FIG. 5. FIG. 5 also shows a sloped slot 12' pattern superimposed onto an axial coil 14 and projected onto a two-dimensional surface. Although the coil 14 in FIG. 4 is shown comprising multiple windings, it will be understood by those skilled in the art that the shields of the invention are effective with coils 14 composed of one or more windings.

While FIGS. 3–5 show straight slots 12', in general the slots 12' may be curved in order to maintain the direction of the slots 12' perpendicular to the directions of the winding(s) or to keep them perpendicular to the desired direction of the electric field that is to pass through the shield without attenuation. By surrounding an axial coil 14 with a shield 10, only the component of the electric field perpendicular to the slot 12' will pass through without significant attenuation; the components parallel to the slot 12' will be significantly attenuated. The electric field that passes through the slots 12' is in the direction that would result from a true tilted antenna. Basically, the shield 10 functions as a polarizer that passes components of the EM field corresponding to a magnetic dipole oriented at an angle relative to the instrument axis.

Figure 6:
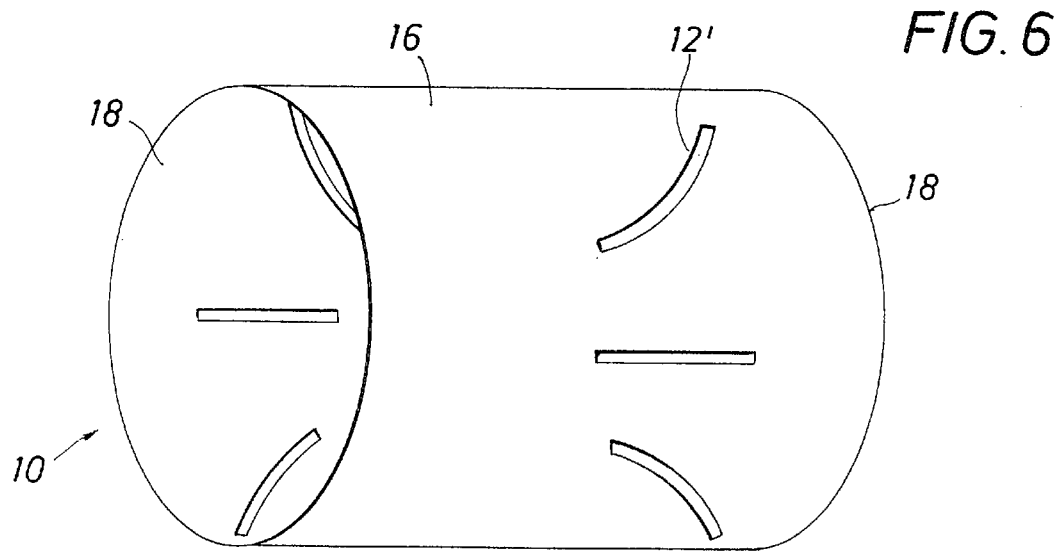
FIG. 6 is a perspective view of a cylindrical shield in accord with the invention.

FIG. 6 shows an embodiment of a shield 10 configured as a hollow body 16 with apertures 18 at both ends. The shield 10 is formed of a conductive material, typically metal. The ends 18 are adapted for connection to the instrument using mating threads, fasteners, or other suitable means known in the art. Typical logging instruments consist of an elongated metallic pipe or mandrel as a central support means upon which sensors, electronics, and other instrumentation are mounted. It will be understood that other support means, such as coiled tubing or non-metallic sondes, may be used to implement the invention, as the precise type of support means is immaterial here. The hollow body 16 may be open-ended or closed-ended. The body 16 is generally formed in the shape of a hollow cylinder. A right circular cylinder is preferable, although other shapes, such as an elliptical cylinder may be employed or various modifications to the cylindrical shape can be made to facilitate various other measurements. Preferably, a shield 10 will independently surround each coil on the instrument although a single longer shield may also surround multiple coils (not shown).

Figure 7:
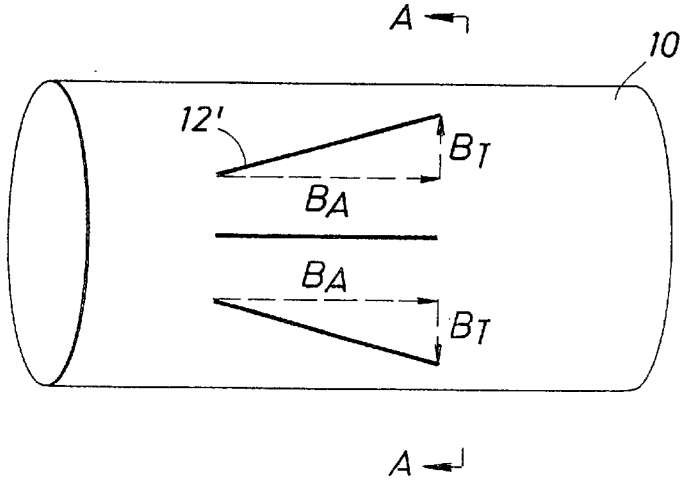
FIG. 7 is a schematic diagram of a cylindrical shield in accord with the invention. Dashed arrows represent the axial magnetic dipole and transverse magnetic dipole components associated with the slot pattern of the shield.

The EM radiation pattern around a logging instrument may be affected by the instrument itself, so optimum shield 10 operation may require fine tuning the exact slot 12' pattern. Modeling shows that borehole eccentricity can have a large deleterious effect on a measurement using TMDs. Eccentered TMDs can couple directly into TM borehole modes via the TM mode's azimuthal magnetic field (B$\phi$). Since a tilted coil 14 can be represented as a vector sum of an axial magnetic dipole and a transverse magnetic dipole, it will also be susceptible to large eccentricity effects. However, the disclosed shield 10 configurations will provide some immunity to the TM mode, so the eccentricity effects may be reduced in severity. FIG. 7 shows the axial magnetic dipole component $B_A$ and the transverse magnetic dipole component $B_T$ associated with each slot 12'.

The shields 10 of the invention may be modified or combined to alter the effects of incident EM energy. Multiple shields 10 may be overlaid coaxially around an antenna. Combinations of sloped and axial slots of varying length, width, thickness, orientation, symmetry, density, or spacing may be formed on a shield 10. The sloped slots 12' may have equal or varied slope angles. The slots 12' may be partially or entirely filled with some sort of lossy (i.e., conductive)

material. A conductive element, such as a metallic strap or wire, may be connected between the sides of a slot 12' to partially short out the slot 12'.

A shield 10 may also be formed comprising two halves or several sections configured to form a cylinder when combined (not shown). Such a configuration may further comprise one section or one half of the shield 10 being electrically isolated from the other half or other sections. The spacing between the antenna and its support means or the spacing between the antenna and the shield 10 may also be varied. It will be appreciated by those skilled in the art having the benefit of this disclosure that other modifications may be employed to increase the efficiency of the shield 10.

4.2. Strip Shield

Figure 8:
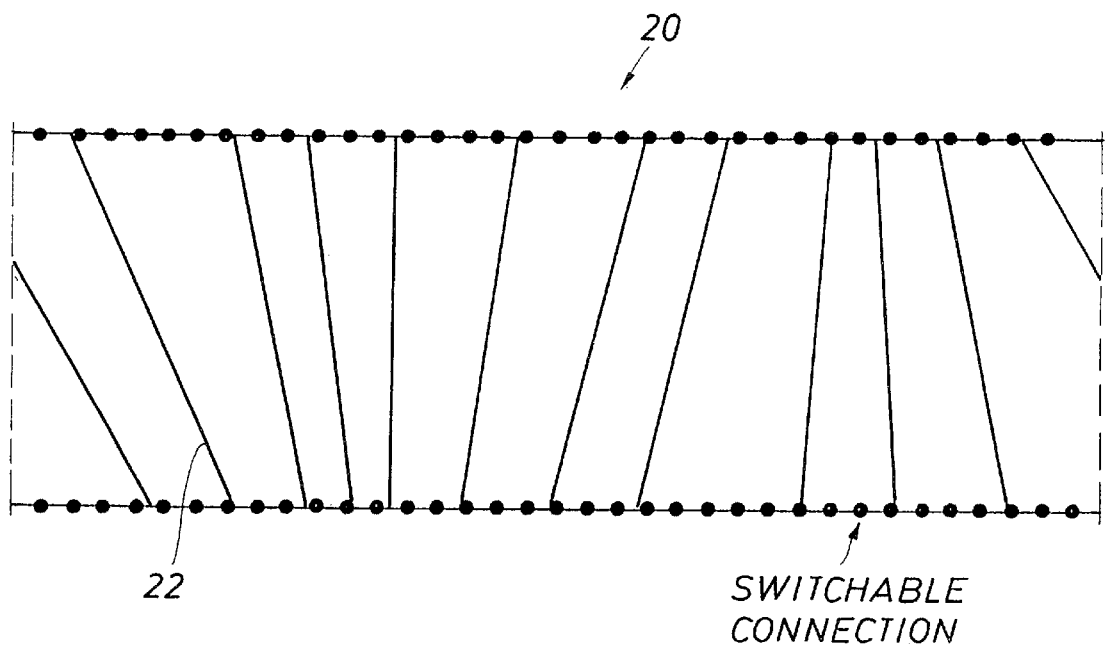
FIG. 8 is a schematic diagram of a shield composed of a strip in accord with the invention. The strip is shown projected onto a two-dimensional surface.

FIG. 8 illustrates another shield embodiment of the invention. A shield may be implemented in the form of a strip 20, also referred to as a flex circuit. Flex circuit technology is similar to that used in conventional multi-layer printed circuit board where each layer may consist of conductive regions on a resistive substrate. Connections can be made through the layers to points on other layers or to the outside. The difference with a flex circuit is that the substrate material is flexible and so after construction, the entire strip can be bent. The strip 20 is shown projected onto a two-dimensional surface for clarity of illustration. An effective strip 20 may be formed of any suitable non-conductive material that can be adapted to coaxially surround the antenna. The strip 20 is preferably flexible, but it may also be formed of a rigid material. The strip 20 contains at least one conductive element 22, preferably a multitude of elements 22. The conductive elements 22 may be formed of fine strips of copper or other suitable conductive materials.

As described above, a shield incorporating sloped slots may be used to rotate the magnetic moment of an antenna. Thus, the conductive elements 22 are disposed in the strip 20 such that each element 22 is sloped at an angle with respect to the instrument axis when the strip is mounted on the instrument to surround the antenna. Since the strip 20 is non-conductive (unlike the shield embodiments described above), the elements 22 must also be configured to form a loop around the antenna when the strip surrounds the antenna. The loop provides the path in which currents can flow around the antenna in order to rotate the axis of the magnetic dipole. The strip 20 provides selective attenuation of the EM energy emitted or received by an antenna when a complete loop is formed around the antenna by the conductive element 22.

A switchable connection is provided in the strip 20 to selectively open or close the loops formed by the conductive elements 22, as illustrated in FIG. 8. This connection may be a series of connections or only one connection. The connection(s) may also be located at any suitable point in the circuit. When the connection is closed, the element 22 acts to rotate the antenna's magnetic dipole. When it is open, it has no effect. One form of a switchable connection utilizes a MosFET switch to open or close the current path around the antenna. Other suitable means may be utilized to form the switchable connection(s) as known in the art. The strip 20 may also comprise additional switching means (not shown) to provide an electrical short with the support member if desired.

The strip 20 may be modified or combined to alter the effects of incident EM energy. Multiple layers of conductive elements 22 having different directions of magnetic dipole moments may also be disposed on the strip 20. This would allow the use of a single axial coil 14 as a transmitter or receiver and by closing the switchable connection(s) on the strip 20, different rotations of the magnetic moment could be achieved. Alternatively, multiple strips 20 could be overlaid coaxially to surround an antenna.

4.3. Directional Measurements

By altering the direction of the magnetic dipole, an antenna can be used to make formation measurements at multiple orientations. This section describes a method for winding and shielding an antenna structure to produce a set of TMDs.

Figure 9:
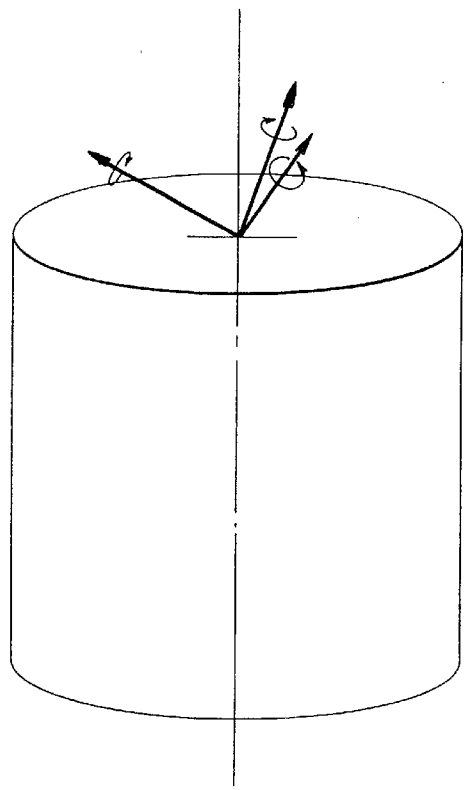
FIG. 9 is a schematic diagram representative of a set of tilted magnetic moments oriented about a longitudinal axis.

By superimposing or overlaying three coils around a support means and wrapping the coils with one or more strips 20, a tri-axial dipole set may be produced. FIG. 9 illustrates a set of magnetic moments directed along three orthogonal directions at an equal angle to the longitudinal axis of the instrument. With this configuration, the three antennas and their corresponding strip(s) 20 can be turned on or off independently. This allows for any one antenna and polarizer pair to be engaged, while the other two sets are disengaged.

The construction of an antenna and polarizer strip 20 for the simplest case (which would be just one coil and its corresponding polarizer) will now be described. The coil may be wound around a support (such as an insulated mandrel) from any suitable conductive wire as known in the art. Referring to FIG. 2, to produce a magnetic dipole at some angle Φ between 0° and 90°, the location of the center of the thread should follow $$Z(\phi) = -\alpha \tan \Phi \cos \phi + p\phi, \quad (4)$$

where α is the radius of the support means, φ is the azimuthal angle, and p is the pitch. The wire is preferably wound closely packed so that the thread depth and width are on the order of the wire diameter d and α>>p≧d where d is the wire diameter.

Figure 10:
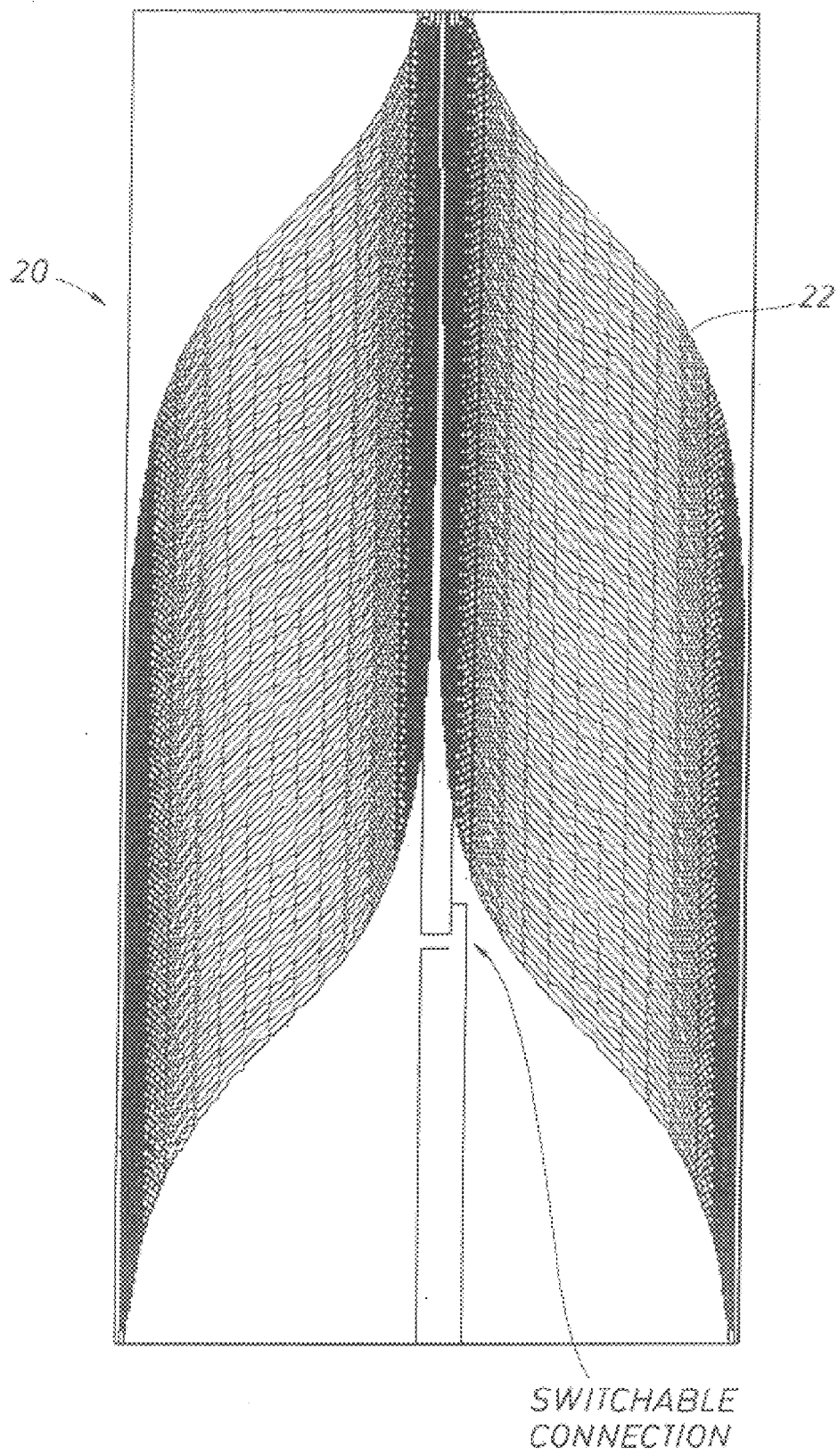
FIG. 10 is an unwrapped view of a shield composed of a strip containing multiple conductive elements in accord with the invention.

The polarizer strip 20 may be constructed so that the conductive elements 22 are everywhere perpendicular to the current in the coil windings. FIG. 10 shows an embodiment of a strip 20 containing conductive elements 22. The conductive elements may be embedded, glued, or affixed to the strip in any suitable manner as known in the art. The functional form $f(\phi')$ of these conductive elements 22 is derived by $$f(\phi') = \int \frac{-1}{\frac{dz}{d\phi}} d\phi', \quad (5)$$

where $$\frac{dz}{d\phi} = -a\tan\theta\sin\phi', \quad (6)$$

evaluated at $\phi = \phi'$. Therefore, $$f(\phi) = \int \frac{1}{\beta\sin\phi} = \frac{1}{2\beta} \ln\left(\frac{1+\cos\phi}{1-\cos\phi}\right), \quad (7)$$

where β=α tan Φ.

Figure 11:
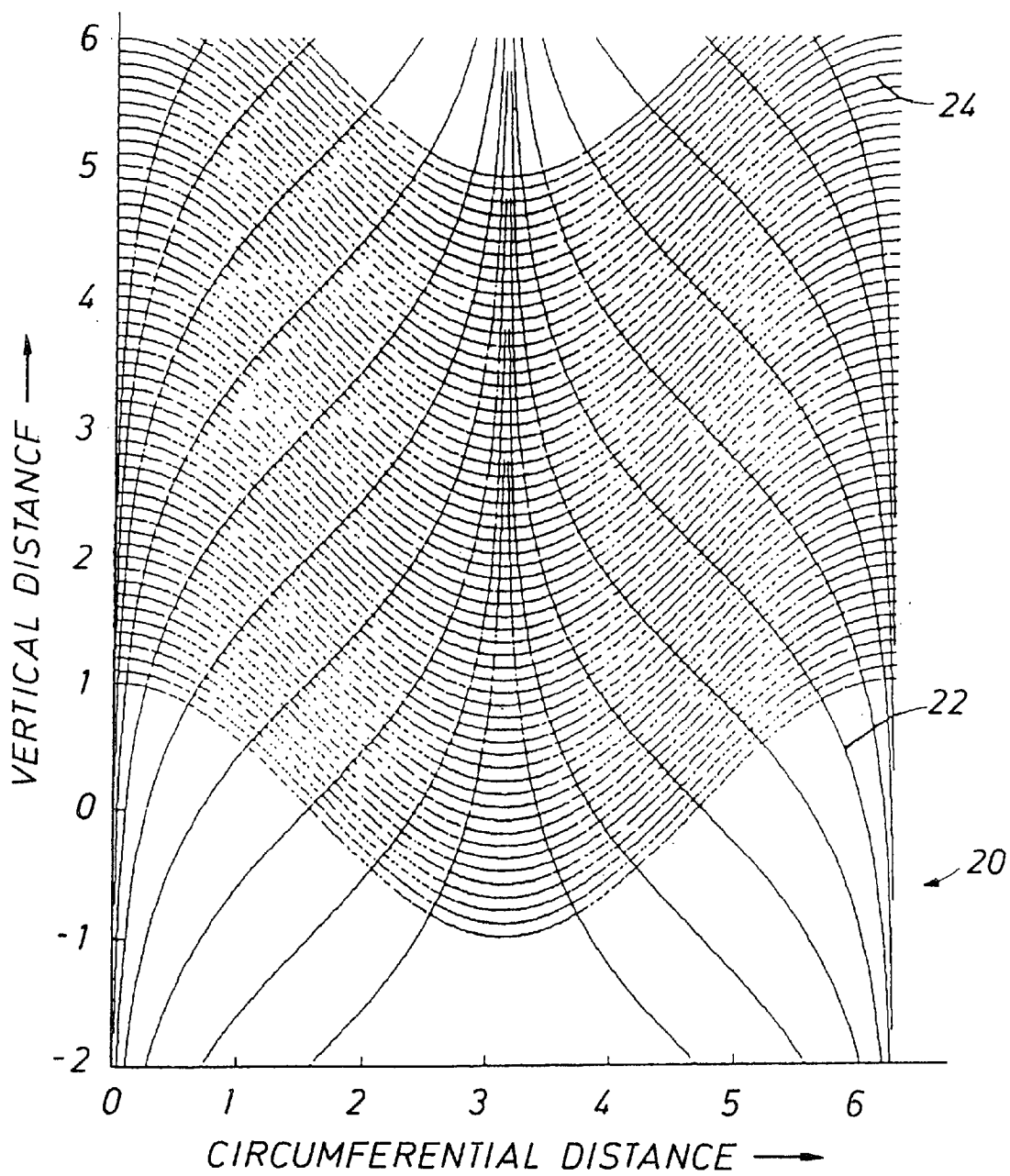
FIG. 11 is a diagram of the shield of FIG. 10 superimposed over the windings of a tilted coil in accord with the invention.

In addition to providing selective attenuation of EM energy components, the polarizer strip 20 acts as a Faraday shield to reduce capacitive coupling between antennas, without attenuating the desired components of the magnetic field. The behavior as a Farady shield is comparable to the behavior of conventional shields used on present generation induction or propagation instruments. FIG. 11 shows the strip 20 of FIG. 10 superimposed over the windings 24 of a tilted antenna. As shown in FIG. 11, the conductive elements 22 are everywhere perpendicular to the coil windings.

Although FIG. 11 shows the superposition of a strip 20 over a coil 14, the same pattern applies to the superposition of a cylindrical shield 10 with sloped slots 12' over a coil 14. The simplified antenna and strip 20 described above can be overlaid to create a set of basis magnetic dipoles. These can be used to construct an antenna structure that provides selective three-dimensional measurement capability.

4.4. Transverse Slots

Figure 12:
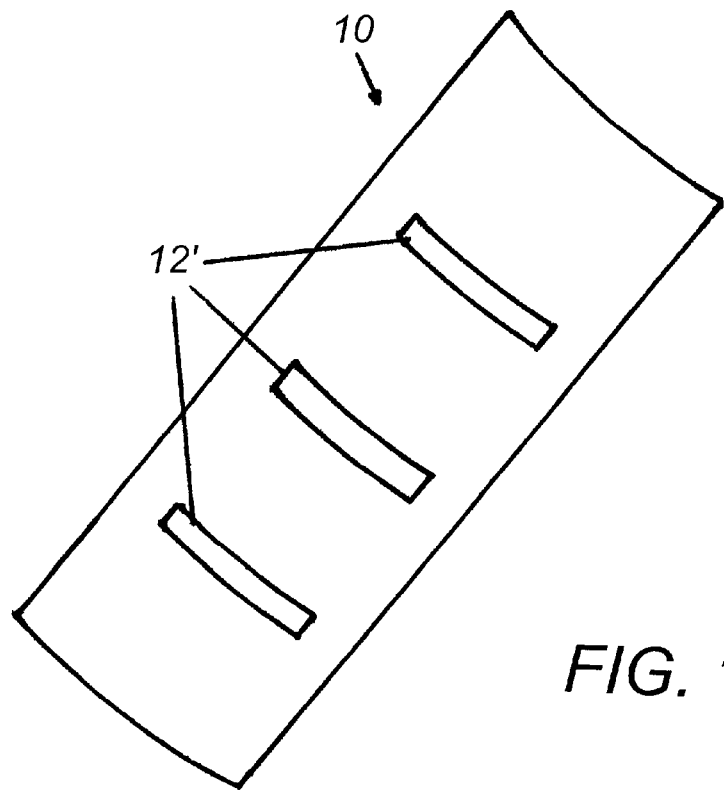
FIG. 12 is a partial view of a shield illustrating a plurality of horizontal slots displaced along the planar surface in accord with the invention.

A transverse magnetic dipole antenna is a key building block for tri-axial and directional measurements. To generate a pure transverse magnetic dipole EM field, a shield configured with a transverse slot is preferred. FIG. 12 shows a shield 10 embodiment of the invention. A plurality of horizontal slots 12' are spaced along the body of the shield 10. The slots 12' are preferably parallel to one another. Similar to the shield embodiments discussed above, the optimal shield 10 for a pure transverse magnetic dipole EM field should have slots that are perpendicular to coil excitation.

Figure 13:
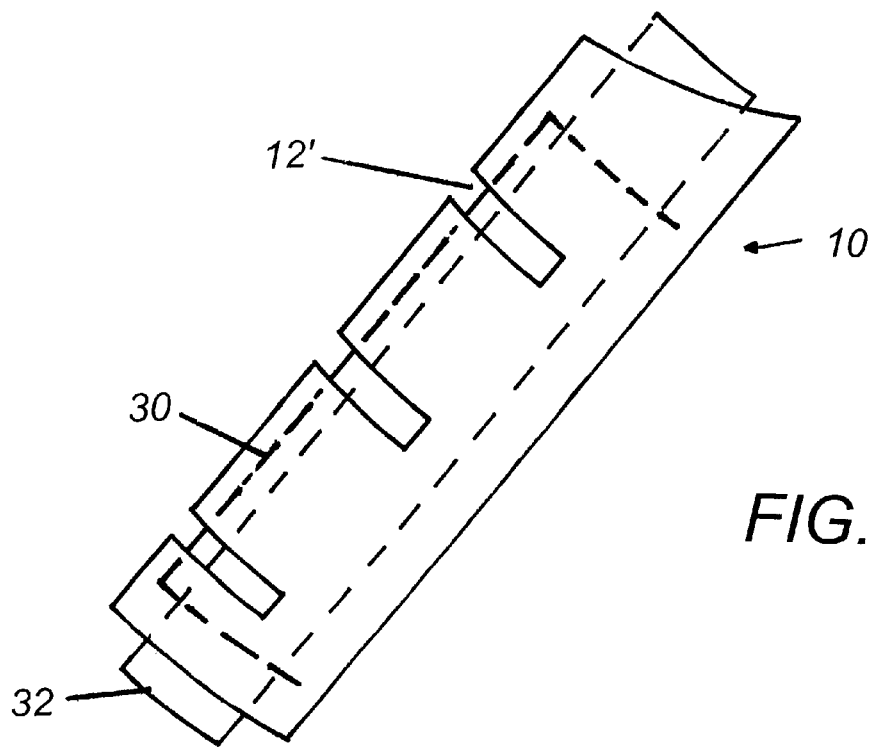
FIG. 13 is a schematic diagram of a shield disposed on a support in alignment with and covering an antenna mounted on the support in accord with the invention.
Figure 14A:
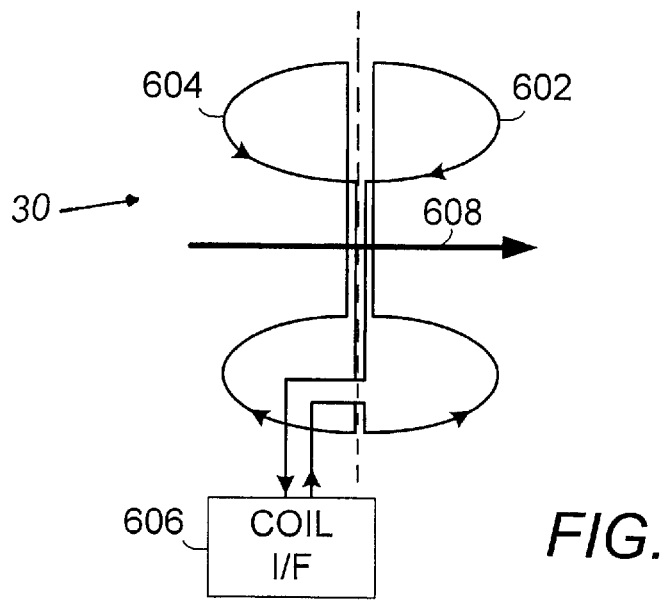
FIGS. 14a–14c illustrate antenna configurations employing a transverse coil configuration using one or more saddle coils in accord with the invention.

FIG. 13 shows a shield 10 covering an antenna 30 disposed on a support member 32. The antenna 30 comprises a transverse coil configuration using one or more saddle coils. Turning to FIG. 14a, an antenna 30 is illustrated having segmented coils 602 and 604. These segmented coils together produce a magnetic dipole 608 that extends radially from the support (represented by the dashed line). As is generally illustrated, the segmented coils 602, 604 are formed to extend about the circumference of the support. We refer to this as a saddle coil, because its shape resembles that of a saddle. It consists of a circular arc at the top and bottom of the coil connected by a longitudinal segment. Often we will have a pair of these coils disposed on azimuthally opposite sides of the support member of the instrument. The coil segments 602, 604 may be connected in series to insure equal current parameters, or they may be connected in parallel if desired. Alternatively, the segmented coils 602, 604 may be independently disposed on the support and energized to produce the magnetic dipole.

Figure 14B:
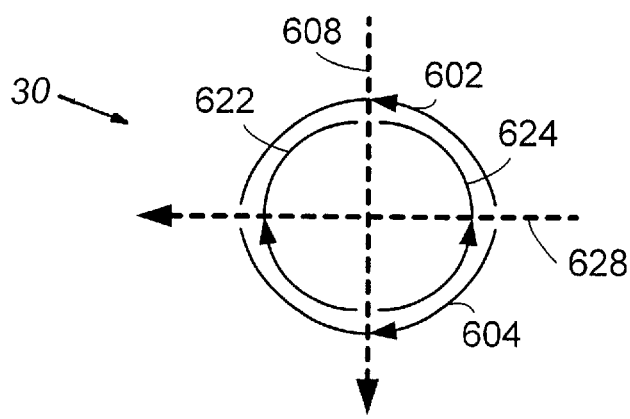
Figure 14C:
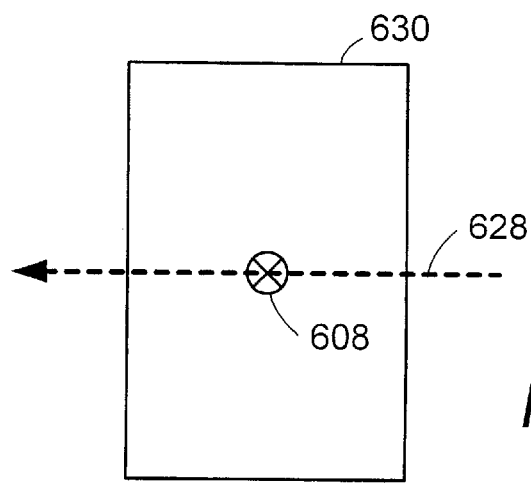

Turning to FIG. 14b, which is an axial view of the instrument, another antenna 30 embodiment includes a second set of half-coils 622, 624 that orient and receive current so as to produce a magnetic dipole 628 that also extends radially from the support on which the half-coils are mounted. Half-coils 602 and 604 are overlaid to surround half-coils 622 and 624. The half-coils 622, 624 are disposed on the support to produce the magnetic dipole 628 so that dipole 628 is rotated azimuthally with respect to the magnetic dipole 608. The design of half-coils 622 and 624 is similar to the design of half-coils 602 and 604, however they are rotated azimuthally with respect to the previous set. FIG. 14c further illustrates the orientation of these magnetic dipoles 608, 628. These magnetic dipoles 608 and 628, disposed within the borehole 630, are controllable so that the measurement sensitivity may be directed axially from the support at any azimuth angle.

Figure 15:
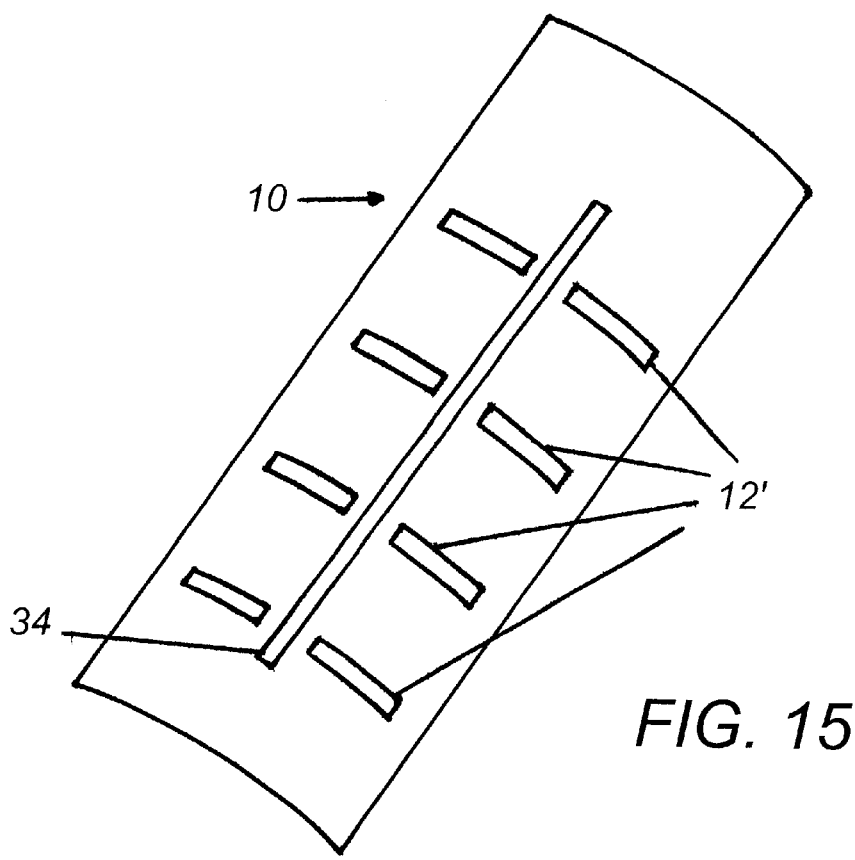
FIG. 15 is a partial view of a shield illustrating an axial slot formed between two rows of horizontal slots along the planar surface in accord with the invention.

With the use of a saddle coil antenna 30, since the excitation current is primarily longitudinal (z-directed), the corresponding slots 12' are azimuthal and the shield body is centered over the center of the antenna 30, as shown in FIG. 13. By varying the number, dimensions, and/or displacement of the slots 12' on the shield 10 surface, the attenuation of interacting EM field components is altered. Attenuation of these field components may be reduced by using one or more axial (vertical) slots in combination with the transverse slot(s) 12'. FIG. 15 shows another shield 10 embodiment of the invention. An axial slot 34 is disposed between two sequences of transverse slots 12' such that when the shield 10 is mounted, the slot 34 is parallel to the support axis. Axial slots 34 could also be disposed over the upper and lower parts of the saddle coils where the coils are composed of azimuthal sections. It will be understood by those skilled in the art that the shield 10 may be configured with various combinations of axial and transverse slots, e.g., the shield 10 may comprise a sequence of transverse slots with a plurality of axial slots (not shown).

Figure 16:
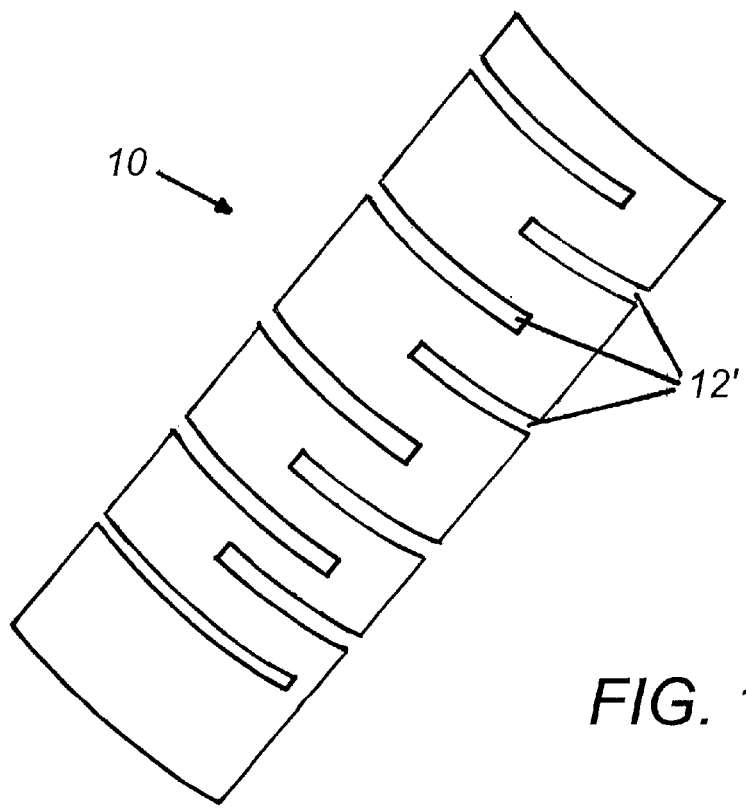
FIG. 16 is a partial view of a shield illustrating a plurality of staggered horizontal slots displaced along the planar surface in accord with the invention.

FIG. 16 shows another shield 10 embodiment of the invention. The mechanical robustness of the shield 10 may be increased by the use of staggered transverse slots 12'. This shield 10 design provides other advantages, including allowing the use of 90° saddle coil antennas with separate excitation of x and y directed TMDs (not shown). The strip 20 shield described above may also be configured with transverse conductive elements 22 to provide the desired EM attenuation (not shown). It will be apparent to those skilled in the art, that various transverse-slot configurations may be implemented with the shields 10 of the invention in conjunction with saddle, tilted coils or multi-layered tri-axial coils. For example, the length of the transverse slots 12' may shortened and axial slots 34 may be interspersed in between the transverse slots (not shown). Another shield 10 implementation may include a crossed slot configuration (not shown).

Another embodiment of the invention involves a process for shielding a source or sensor disposed on a support that is adapted for disposal within a borehole. The process entails mounting a shield 10 of the invention on the support to cover the source or sensor. The shield 10 having at least one slot 12' formed therein such that the slot 12' is orthogonal to the longitudinal axis of the support. The shield 10 thus provides predetermined attenuation of EM field components as the field interacts with the shield.

Another embodiment of the invention involves a process for shielding a source or sensor disposed on a support that is adapted for disposal within a borehole. The process entails mounting a flexible strip 20 of the invention on the support to cover the source or sensor. The strip 20 having at least one conductive element 22 disposed therein such that the element 22 is orthogonal to the longitudinal axis of the support. The strip 20 thus provides predetermined attenuation of EM field components as the field interacts with the strip.

Another embodiment of the invention involves the use of multiple tilted coils disposed at different angles so that the sum of their magnetic moments is in the transverse plane. A shield with transverse slots is then placed over the antennas where the total electric field is vertical (not shown). A shield of the invention with a combination of vertical and transverse slots (such as shown in FIG. 15) could be used with a set of tilted coils to produce a magnetic moment with arbitrary direction.

While the methods and apparatus of this invention have been described as specific embodiments, it will be apparent to those skilled in the art that other embodiments of the invention can be readily devised which do not depart from the concept and scope of the invention as disclosed herein. All such similar variations apparent to those skilled in the art are deemed to be within the scope of the invention as defined by the appended claims.

What is claimed is:

1. An apparatus for use with an elongated support having at least one antenna adapted to transmit or receive electromagnetic energy mounted thereon, said antenna adapted to produce a substantially transverse magnetic moment when activated to transmit electromagnetic energy, said support having a longitudinal axis and adapted for disposal within a borehole, comprising:

a shield having a body adapted to form a cylindrical surface and for mounting on said support in alignment with the at least one antenna; and said shield body having at least one slot formed therein such that said slot is perpendicular to the longitudinal support axis when said body is mounted on said support; wherein said shield attenuates interacting electromagnetic field components to facilitate a substantially transverse magnetic dipole field near the at least one antenna.

2. The apparatus of claim 1, wherein each at least one slot is filled with a lossy material.

3. The apparatus of claim 1, wherein said body includes multiple slots formed therein such that each slot is perpendicular to said longitudinal axis when said body is mounted on said support.

4. The apparatus of claim 1, said body further including at least one slot that is parallel to said longitudinal axis when said body is mounted on said support.

5. The apparatus of claim 3, wherein said multiple slots have varying lengths.

6. The apparatus of claim 3, wherein said multiple slots have equal lengths.

7. The apparatus of claim 3, wherein said multiple slots are asymmetrically spaced on said body.

8. The apparatus of claim 3, wherein said multiple slots form a first sequence of slots on said body.

9. The apparatus of claim 8, said body further including a second sequence of slots, each slot being perpendicular to said longitudinal axis when said body is mounted on said support.

10. The apparatus of claim 9, said body further including at least one slot that is parallel to said longitudinal axis when said body is mounted on said support.

11. The apparatus of claim 10, wherein said at least one slot that is parallel to said longitudinal axis is positioned between said first and second sequence of slots.

12. The apparatus of claim 1, wherein said body is metallic.

13. The apparatus of claim 12, wherein said body is shaped to form a hollow right circular cylinder.

14. The apparatus of claim 13, wherein said body is formed of an electrically conductive material.

15. The apparatus of claim 13, wherein said body comprises two halves adapted to form said cylinder.

16. A system for measuring a property of a subsurface formation, comprising:

an elongated support having a longitudinal axis, said support being adapted for disposal within a subsurface borehole traversing said formation;

a source or sensor mounted on said support;

said source or sensor respectively adapted to produce a substantially transverse magnetic moment when activated or to detect a signal associated with a substantially transverse magnetic moment;

a shield mounted on said support to cover said source or sensor; and said shield having at least one slot formed therein, said slot being perpendicular to said longitudinal axis of said support; wherein said shield attenuates interacting electromagnetic field components to facilitate a substantially transverse magnetic dipole field near the source or sensor.

17. The system of claim 16, wherein said source or sensor comprises an antenna having a magnetic dipole moment and adapted to transmit and/or receive electromagnetic energy.

18. The system of claim 17, wherein said antenna is disposed on said support such that said magnetic dipole moment is tilted or perpendicular with respect to said longitudinal axis of said support.

19. The system of claim 18, wherein said shield is mounted on said support such that said at least one slot is positioned over said antenna.

20. The system of claim 17, wherein said antenna comprises a saddle coil.

21. The system of claim 16, wherein each at least one slot is filled with a lossy material.

22. The system of claim 16, wherein said shield comprises multiple slots formed therein, each slot being perpendicular to said longitudinal axis of said support.

23. The system of claim 22, wherein said multiple slots have varying lengths.

24. The system of claim 22, wherein said multiple slots have equal lengths.

25. The system of claim 22, wherein said multiple slots are asymmetrically spaced on said shield.

26. The system of claim 22, wherein said multiple slots form a first sequence of slots on said shield.

27. The system of claim 26, said shield further comprising a second sequence of slots formed therein, each slot being perpendicular to said longitudinal axis of said support.

28. The system of claim 27, said shield further comprising at least one slot that is parallel to said longitudinal axis of said support.

29. The system of claim 28, wherein said at least one slot that is parallel to said longitudinal axis is positioned between said first and second sequence of slots.

30. The system of claim 16, wherein said shield is metallic.

31. The system of claim 30, wherein said shield is shaped to form a hollow right circular cylinder.

32. The system of claim 31, wherein said shield is formed of an electrically conductive material.

33. The system of claim 31, wherein said shield comprises two halves adapted to form said cylinder.

34. A method for shielding a source or sensor, respectively adapted to produce a substantially transverse magnetic moment or to detect a signal associated with a substantially transverse magnetic moment, disposed on an elongated support having a longitudinal axis and adapted for disposal within a borehole, comprising mounting a body adapted to form a cylindrical surface on said support to cover said source or sensor, said body having at least one slot formed therein such that said slot is perpendicular to said longitudinal axis, wherein said body attenuates interacting electromagnetic field components to facilitate a substantially transverse magnetic dipole field near the source or sensor.

35. The method of claim 34, wherein said source or sensor comprises an antenna having a magnetic dipole moment and adapted to transmit and/or receive electromagnetic energy.

36. The method of claim 35, wherein said antenna is disposed on said support such that said magnetic dipole moment is tilted or perpendicular with respect to said longitudinal axis of said support.

37. The method of claim 36, wherein said body is mounted on said support such that said at least one slot is positioned over said antenna.

38. The method of claim 37, wherein said antenna comprises a saddle coil.

* * * * *